United States Patent
Wang et al.

(10) Patent No.: US 8,899,033 B2
(45) Date of Patent: *Dec. 2, 2014

(54) BRAKE BOOSTER LEAK DETECTION SYSTEM

(75) Inventors: Zhong Wang, Westland, MI (US); Tony T. Hoang, Warren, MI (US); Daryl A. Wilson, Ypsilanti, MI (US); Margaret C. Richards, Royal Oak, MI (US); Lan Wang, Troy, MI (US)

(73) Assignee: GM Global Technology Operations LLC

(*) Notice: Subject to any disclaimer, the term of this patent is extended or adjusted under 35 U.S.C. 154(b) by 1760 days.

This patent is subject to a terminal disclaimer.

(21) Appl. No.: 12/013,676

(22) Filed: Jan. 14, 2008

(65) Prior Publication Data

US 2009/0071147 A1 Mar. 19, 2009

Related U.S. Application Data

(60) Provisional application No. 60/973,585, filed on Sep. 19, 2007.

(51) Int. Cl.
*B60T 13/52* (2006.01)
*B60T 17/22* (2006.01)
*B60T 17/18* (2006.01)

(52) U.S. Cl.
CPC .................................. *B60T 17/18* (2013.01)
USPC .......................................................... 60/397

(58) Field of Classification Search
USPC ................... 60/398, 397; 303/122.09, 122.05
See application file for complete search history.

(56) References Cited

U.S. PATENT DOCUMENTS

| 6,443,535 | B1 | 9/2002 | Crombez et al. |
| 6,871,918 | B2 * | 3/2005 | Wild et al. ............... 303/122.09 |
| 7,878,053 | B2 * | 2/2011 | Lehner et al. .................... 73/121 |
| 2003/0006891 | A1 | 1/2003 | Wild et al. |

FOREIGN PATENT DOCUMENTS

| DE | 4439904 A1 | 5/1996 |
| DE | 19743959 A1 | 4/1999 |
| DE | 19834128 A1 | 12/1999 |
| DE | 10039787 (A1) | 2/2002 |
| DE | 10146367 (A1) | 4/2003 |
| WO | 0214132 (A1) | 2/2002 |

* cited by examiner

*Primary Examiner* — F. Daniel Lopez

(57) ABSTRACT

A control system for evaluating a brake booster system includes an engine evaluation module that detects an engine off condition. A pressure evaluation module, during the engine off condition, monitors hydraulic brake line pressure, detects a change in brake booster pressure, and determines a brake booster vacuum decay rate based on the change in brake booster pressure. A fault reporting module detects a brake booster system fault based on the brake line pressure and the brake booster vacuum decay rate.

21 Claims, 3 Drawing Sheets

Ihe present disclosure relates to brake booster systems for

BRAKE BOOSTER LEAK DETECTION SYSTEM

CROSS-REFERENCE TO RELATED APPLICATIONS

This application claims the benefit of U.S. Provisional Application No. 60/973,585, tiled on Sep. 19, 2007. The disclosure of the above application is incorporated herein by reference in its entirety.

FIELD

The present disclosure relates to brake booster systems for hybrid vehicles.

BACKGROUND

The statements in this section merely provide background information related to the present disclosure and may not constitute prior art.

As an alternative to the internal combustion engine, automotive manufacturers have developed hybrid power-trains that include both an electric traction machine and an internal combustion engine. During operation, vehicles including the hybrid powertrain use one or both of the power sources to improve efficiency.

Hybrid vehicles include either a parallel drivetrain configuration or a series drivetrain configuration. In the parallel hybrid vehicle, the electric machine works in parallel with the engine to combine the power and range advantages of the engine with the efficiency and the electrical regeneration capability of the electric machine. In the series hybrid vehicle, the engine drives a generator to produce electricity for the electric machine, which drives a transaxle. This allows the electric machine to assume some of the power responsibilities of the engine, thereby permitting the use of a smaller and more efficient engine. Additionally, for either described hybrid configuration, the engine may be turned off while the vehicle is stopped and the driver's foot remains on the brake pedal. This is done to conserve fuel—increasing the duration of engine stoppage while the vehicle is at rest increases the hybrid fuel economy benefit.

Some hybrid vehicles include a vacuum driven brake booster that reduces the brake pedal effort required to achieve a desired vehicle braking force. These hybrid vehicles use the engine's intake manifold as a source for the vacuum which is stored in the brake booster. When the engine is turned off for hybrid operation, a finite level of vacuum is held in the brake booster which is depleted as the brake pedal is modulated. Hybrid vehicles require sufficient brake booster vacuum levels during engine off operation to maintain brake assist, if brake booster vacuum falls below a threshold during engine off hybrid operation, the engine will start so that brake booster vacuum can be replenished.

Normally brake booster vacuum is depleted via brake modulation. A leaky brake booster system can also cause brake vacuum depletion and reduce effectiveness of a brake booster. A leak can cause brake booster vacuum to reduce to a level that causes the engine to unduly start. A hybrid vehicle engine auto-starts when brake booster pressure is below a threshold level. Thus, a leak can shorten hybrid engine off operation, which may impact emissions and fuel economy.

SUMMARY

A control system for evaluating a brake booster system is provided and includes an engine evaluation module that detects an engine off condition. A pressure evaluation module, during the engine off condition, monitors hydraulic brake line pressure, detects a change in brake booster pressure, and determines a brake booster vacuum decay rate based on the change in brake booster pressure. A fault reporting module detects a brake booster system fault based on the brake line pressure and the brake booster vacuum decay rate.

In other features, a method of monitoring a brake booster system for vacuum leaks is provided and includes detecting an engine off condition. During the engine off condition, brake line pressure is monitored and a change in brake booster pressure is determined. Brake booster vacuum pressure decay rate is determined based on the change in brake booster pressure. A brake booster fault is detected based on the brake line pressure and the brake booster vacuum pressure decay rate.

In other features, a hybrid vehicle is provided that includes an engine. A brake booster vacuum system is in fluid communication with a braking system, is in vacuum pressure communication with an intake manifold of the engine, and provides braking assistance to the braking system. A first pressure sensor generates a brake line pressure signal based on a brake pressure of the braking system. A second pressure sensor generates a brake booster pressure signal based on a brake booster pressure of the brake booster vacuum system. A control module detects a vacuum leak in the brake booster vacuum system based on the brake line pressure signal and a brake booster vacuum decay rate. The control module determines the brake booster vacuum decay rate based on the change in the brake booster pressure signal.

Further areas of applicability will become apparent from the description provided herein. If should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
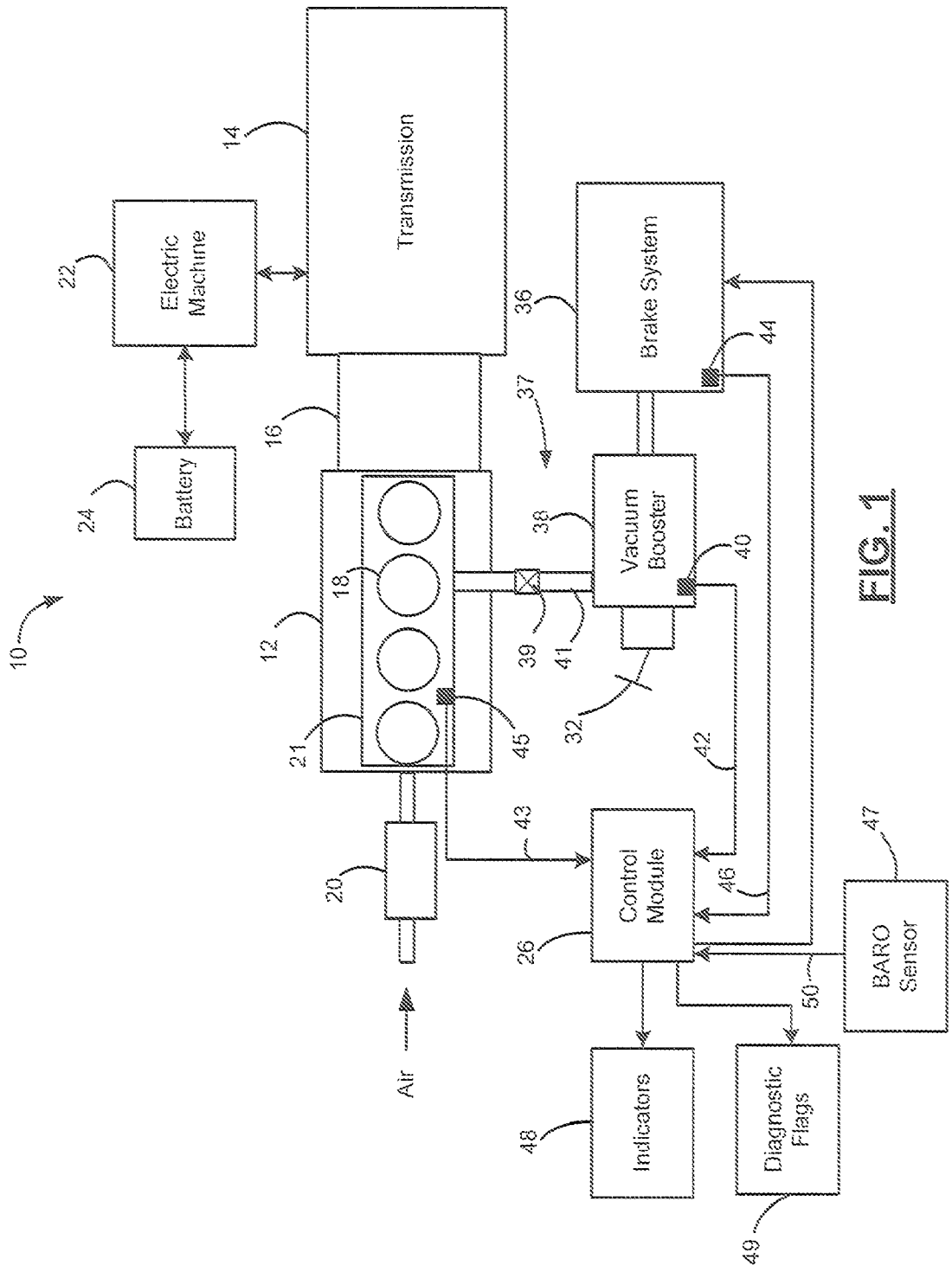
FIG. 1 is a block diagram illustrating a hybrid vehicle including a brake booster leak detection system according to various aspects of the present disclosure.

The following description is merely exemplary in nature and is not intended to limit the present disclosure, application, or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Referring now to FIG. 1, an exemplary hybrid vehicle 10 is shown. As can be appreciated, the brake booster leak detection methods and systems of the present disclosure can be used in various series and parallel hybrid vehicles. For exemplary purposes, the brake booster leak detection methods and systems of the present disclosure will be discussed in the context of a parallel hybrid vehicle. The vehicle 10 shown in FIG. 1 includes an engine 12 that drives a transmission 14. The transmission 14 can be either an automatic or a manual transmission that is driven by the engine 12 through a corresponding torque converter or clutch 16. The engine 12 includes N cylinders 18. Although FIG. 1 depicts four cylinders (N=4), it can be appreciated that the engine 12 may include additional or fewer cylinders 18. For example, engines having 4, 5, 6, 8, 10, 12 and 16 cylinders are contemplated. Air flows into the engine 12 through a throttle 20 into an intake manifold 21 and is combusted with fuel in the cylinders 18.

The vehicle 10 further includes an electric machine 22 and a battery 24. The electric machine 22 operates in one of a motor mode and a generator mode. When operating in the motor mode, the electric machine 22 is powered by the battery 24. When in motor mode, the electric machine 22 provides positive torque which assists the engine 12 and/or drives the transmission 14. When operating in the generator mode, the electric machine 22 generates electrical energy to charge the battery 24. The electric machine 22 may be driven by the engine 12 or by the transmission 14. As can be appreciated, the battery 24 can power other vehicle accessories in addition to the electric machine 22.

A vehicle operator manipulates a brake pedal 32 to regulate vehicle braking. More particularly, a braking system 36 adjusts vehicle braking based on a force applied to the brake pedal 32 to regulate vehicle speed. The braking system receives assistance from a brake booster system 37. The brake booster system 37 includes a vacuum assisted brake booster 38 that receives negative pressure supplied by the intake manifold 21 through a one-way check valve 39. The vacuum assisted brake booster 38 uses the negative pressure as a vacuum to provide extra force to assist driver braking.

The brake booster system 37 ensures adequate vacuum in the brake booster for adequate brake pressure. Vacuum is supplied to the brake booster 38 via a line 41 that extends from the intake manifold 21. Line 41 includes the check valve 39 that allows flow from the brake booster 38 to the engine 12. When brake booster vacuum pressure is greater than engine vacuum pressure, the check valve 39 opens causing the brake booster vacuum to increase until equaling the engine vacuum. When engine vacuum is low, the check valve 39 maintains a higher level of vacuum in the brake booster 38. Brake booster vacuum is depleted when the brakes (measured by brakeline pressure) of the brake system 36 are applied.

For belt, alternator, starter (BAS) hybrid vehicles, the engine 12 is in auto-stop mode when brakes are applied and vehicle speed reduces to zero and when the battery 24 is charged or is at a predetermined power level. The engine 12 may be in auto-stop mode when other conditions are also met. When the engine 12 is in auto-stop mode and when brake booster vacuum is below a threshold value, the auto-stop mode is deactivated. Control auto-starts the engine 12 to run on all cylinders to generate enough engine vacuum to provide an adequate vacuum level in the brake booster 38. A brake booster vacuum leak could cause the engine 12 to switch between auto-stop and auto-start modes inappropriately, too often, sooner than normal, and/or prevent (shorten) auto-stop operation. Thus, a brake booster leak can cause increased emissions and lower fuel economy. The brake booster leak detection systems detect brake booster leaks of various sizes and indicate such leak to a vehicle operator such that appropriate actions can be taken to repair the leak.

The brake booster leak detection system 37 includes the control module 26, which monitors a brake booster pressure sensor 40, a brake line or brake system pressure sensor 44, and a manifold absolute pressure (MAP) sensor 43. The first pressure sensor 40 generates a brake booster pressure signal 42 based on a pressure supplied to the vacuum assisted brake booster 38. The second pressure sensor 44 generates a brake line pressure signal 46 based on a line pressure in the braking system 36. The third pressure sensor 43 generates a manifold pressure signal 45 based on pressure in the intake manifold 21. The control module 26 receives the pressure signals 42, 45, and 46 and detects vacuum leaks in the brake booster system 37. A barometric pressure sensor 47 that generates a barometric pressure signal 50 may also be included.

The brake booster system 37 further includes one or more indicators 48 and diagnostic flags 49. The indicators 48 may be used to indicate to a vehicle operator or technician of a brake booster vacuum leak and information pertaining to that leak, such as size of the leak, location of the leak, type of leak, etc. The diagnostic flags 49 may be used to internally report a vacuum leak and details regarding the leak. The diagnostic flags 49 may be observed via a service facility diagnostic computer.

Figure 2:
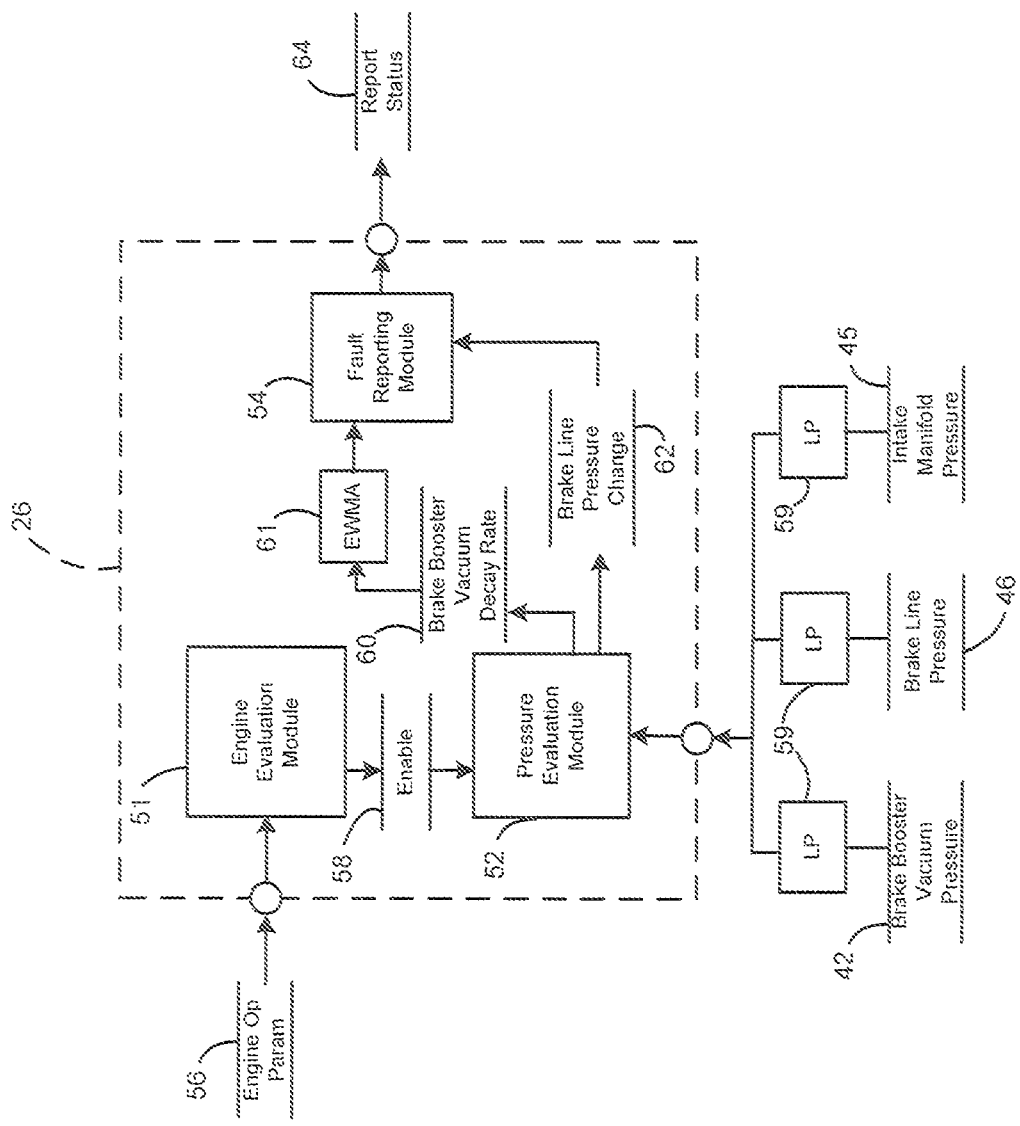
FIG. 2 is a dataflow diagram illustrating a brake booster leak detection system according to various aspects of the present disclosure.

Referring now to FIG. 2, a dataflow diagram illustrates various embodiments of a brake booster leak detection system that may be embedded within the control module 26. Various embodiments of brake booster leak detection systems according to the present disclosure may include any number of sub-modules embedded within the control module 26. As can be appreciated, the sub-modules shown may be combined and/or further partitioned to similarly detect a leak in the vacuum assisted brake booster 38. Inputs to the system may be sensed from the vehicle 10 (FIG. 1), received from other control modules within the vehicle 10 (FIG. 1), and/or determined by other sub-modules within the control module 28. In various embodiments, the control module 26 of FIG. 2 includes an engine evaluation module 51, a pressure evaluation module 52, and a fault reporting module 54.

The engine evaluation module 51 monitors engine evaluation parameters 56 to determine when the engine 12 is OFF. When the engine 12 is OFF, the engine evaluation module 51 may set a diagnostic enable flag 58 to TRUE. Otherwise, the diagnostic enable flag 58 may remain set to FALSE. Although the embodiment disclosed herein are primarily described with respect to when the engine 12 is OFF, the embodiments may be applied to when the engine 12 is ON. The pressure evaluation module 52 may evaluate the pressure signals 42, 45, and 46 when the diagnostic enable flag 58 is TRUE. The pressure signals 42, 45, and 46 may be filtered via, for example, low pass filters 59.

The pressure evaluation module 52 monitors brake booster vacuum 42 and brake line pressure 46 for a predetermined amount of time. During that predetermined amount of time the pressure evaluation module 52 compares brake booster vacuum to engine vacuum. The pressure evaluation module 52 continues to monitor the brake booster vacuum 42 and the brake line pressure 46 unless brake booster vacuum is less than engine vacuum in which case the pressure evaluation module 52 resets values and restarts the evaluation process.

The pressure evaluation module 52 determines change (Delta Δ) in brake booster vacuum. Brake booster vacuum decay rate 60 is determined based on the brake booster vacuum change and the predetermined amount of time. The change in brake line pressure 62 is also determined. The brake booster vacuum decay rate 60 may be filtered via a statistical filter, such as an exponentially weighted moving average (EWMA) filter 61. The brake booster vacuum decay rate 60 and change in brake line pressure 62 are provided to the fault reporting module 54.

The fault reporting module 54 evaluates the brake booster vacuum pressure decay rate 60 and the chance in brake line pressure 62 to determine if a leak is present. If the brake booster vacuum pressure decay rate 60 and/or the change in brake line pressure 62 indicates a vacuum leak or a vacuum leak that is greater than a predetermined level, a report status 64 may be set that indicates a leak is present, information describing the leak, and/or the test has failed. Otherwise, if the brake booster vacuum pressure decay rate 60 and/or the change in brake line pressure 62 indicates no leak or leak within a normal operating range, the report status 64 may be set to indicate a leak is not present, is within a normal operating range, and/or the test has passed. In various embodiments, the fault reporting module 54 applies a statistical filter, such as the EWMA 61, to the brake booster vacuum pressure decay rate 60. The fault reporting module 54 then evaluates a result of the statistical filter to determine whether a leak is present.

Figure 3:
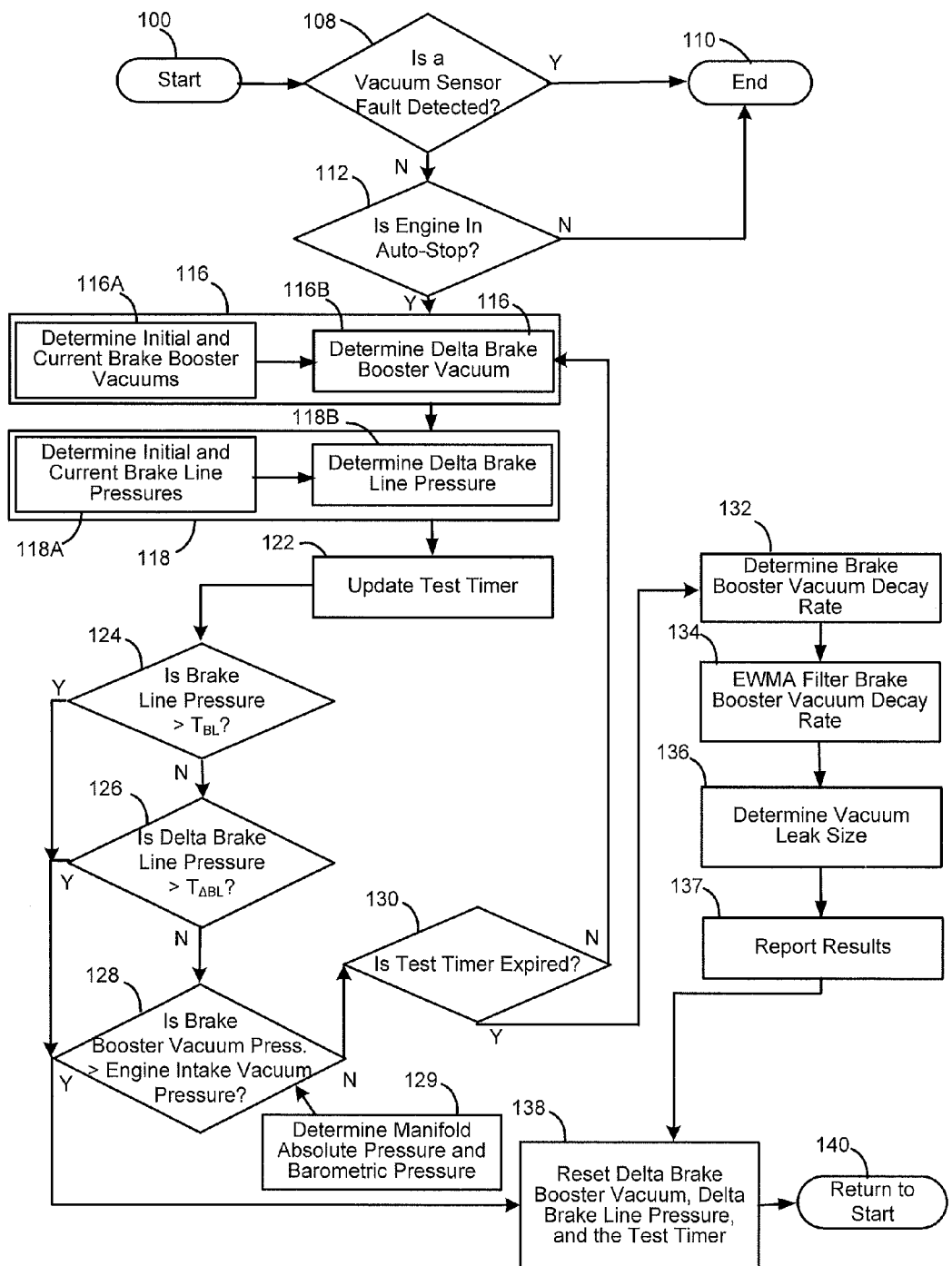
FIG. 3 is a flowchart illustrating a brake booster leak detection method according to various aspects of the present disclosure.

Referring now to FIG. 3, a flowchart illustrates a brake booster leak detection method that can be performed by the control module 26 of FIG. 2 according to various aspects of the present disclosure. Although the following steps are primarily described with respect to the embodiments of FIGS. 1 and 2, they may be modified to apply to other embodiments. As can be appreciated, the order of execution of the steps of the brake booster leak detection method can vary without altering the spirit of the method. The method may be performed periodically during control module operation or scheduled to run based on certain events. The method may begin at 100. In step 108, control determines whether a vacuum sensor or a brake line sensor fault exists with respect to one or more of the sensors 40, 44 and 45. When a vacuum sensor fault exists, control returns to start 100, proceeds directly to step 138, and/or ends at 110. When a vacuum sensor fault does not exist, control proceeds to step 112.

In step 112, engine evaluation parameters may be monitored and evaluated, for example the mode of operation may be monitored. When the engine 12 is in the auto-stop mode, control proceeds to step 116, otherwise control returns to start 100, proceeds directly to step 138, and/or ends at 110.

The following steps 116-130 are repeated while a test timer has not expired and a condition of one of steps 124-128 has not been met. In step 116, a change in brake booster vacuum pressure is determined. An initial brake booster vacuum pressure $BBP_0$ may be captured (step 116A) and be associated with a time=0, such as during a first iteration of steps 116-130. A current brake booster vacuum pressure $BBP_C$ is also determined (step 116B). The initial and current brake booster vacuum pressures may be filtered, such as via a low pass, filter to remove noise. The initial brake booster vacuum pressure $BBP_0$ is subtracted from the current brake booster vacuum pressure $BBP_C$ to determine the change in brake booster vacuum pressure $\Delta BBP$.

In step 118, a change in brake line pressure is determined. An initial brake line pressure $BLP_0$ may be captured (step 118A) and be associated with a time=0, such as during a first iteration of steps 118-130. A current brake line pressure $BLP_C$ is determined (step 118B). The initial and current brake line pressures may be filtered, such as via a low pass filter, to remove noise. The initial brake line pressure $BLP_0$ is subtracted from the current brake line pressure $BLP_C$ to determine the change in brake line pressure $\Delta BLP$.

In step 122, the test timer is updated. For example the test timer may be incremented by one.

In step 124, control determines if the current brake line pressure $BLP_C$ is greater than a brake line threshold value $T_{BL}$. When the current brake line pressure $BLP_C$ is greater than the brake line threshold $T_{BL}$, control may proceed directly to step 138, otherwise control proceeds to step 126. For example, when the vehicle operator is applying a hard brake, brake line pressure increases to a high level. Control elects not to perform a brake booster leak detection test while a hard brake is applied. This prevents inaccurate leak detection measurements. In general, when brake line pressure is not too high, and the brake applied is steady, brake booster vacuum remains at a high level unless a vacuum leak exists.

In step 128, control determined if change in brake line pressure $\Delta BLP$ is greater than a change in brake line pressure threshold $T_{\Delta BL}$. When the brake line pressure $\Delta BLP$ is greater than the change in brake line pressure threshold $T_{\Delta BL}$, control may proceed directly to step 138, otherwise control proceeds to step 128. A large change in brake line pressure may indicate a non-steady braking in the brake system. As an example, when brakes "wiggle", a significant change in brake line pressure may exist. For this reason, brake booster vacuum may become depleted. Thus, to prevent a false brake booster leak indication, control may proceed to step 138 and/or indicate a large change in brake line pressure.

In step 128, control determines if the current brake booster vacuum pressure $BBP_C$ is less than the engine intake vacuum pressure. The engine intake vacuum pressure may be determined based on the manifold absolute pressure signal 43 and a barometric pressure signal, which may be determined in step 129. When the current brake booster vacuum pressure $BBP_C$ is greater than the engine intake vacuum pressure, control may proceed directly to step 138, otherwise to step 130. When brake booster vacuum pressure is greater than engine vacuum pressure, the check valve 39 opens and thus the vacuum system experiences changes in pressure levels. Thus, a leak detection test is not performed.

In step 130, control determines if the test timer has expired. When the test timer is greater than a predetermined test period, control proceeds to step 132, otherwise control returns to step 116.

In step 132, control determines brake booster vacuum decay rate. The brake booster vacuum decay rate is equal to the change in brake booster vacuum pressure $\Delta BBP$ divided by the predetermined amount of time or the predetermined test period of the test timer.

In step 134, control filters the brake booster vacuum decay rate via the EWMA filter 61. This provides a robust diagnostic result. When the brake booster system does not have a leak or the leak is minimal the result out of the EWMA filter 61 is approximately equal to 0. When a leak exists, the result out of the EWMA filter 61 increases and is dependent upon the leak size.

In step 136, control determines if a leak exists. When a leak exists, control determines size of the leak based on the brake booster vacuum decay rate and known parameters of the brake booster system, such as component dimensions, component layout, brake booster configuration, normal engine operating pressures, etc. The leak size is directly related to the brake booster vacuum decay rate.

Leak sizes may be detected, monitored, evaluated, and reported between lower and upper leak thresholds, which may vary per application and system. As an example leak sizes may be detected between approximately 0.013"-0.065". A leak of less than approximately 0.013" may be considered a good/normal operating system. A leak of greater than approximately 0.065" may cause a quick abort of the auto-stop mode. Such a large leak may be detected and reported by control module 26 and/or may be detected and reported by another brake booster monitoring system.

In step 137, control reports results of the brake booster vacuum pressure test, in general, if the result of the statistical filter is zero or below a predetermined threshold, a leak is not present and the test has passed. If the result of the statistical filter is greater than a predetermined threshold, a leak is present and the test has failed.

As can be appreciated, once the report status is set to Test Fail, additional steps can be performed to notify other systems and users of the failure. In various embodiments, a diagnostic code is set based on the report status. The diagnostic code can be retrieved by a service tool or transmitted to a remote location via a telematics system. In various other embodiments, an indicator lamp is illuminated based on the report status. In various other embodiments, an audio warning signal is generated based on the report status.

In step 138, the change in brake booster vacuum pressure, the change in brake line pressure and the test timer may be reset. The brake booster vacuum decay rate may also be reset.

As can be appreciated, all comparisons discussed above can be implemented in various forms depending on the selected values for comparison. For example, a comparison of "greater than" may be implemented as "greater than or equal to" in various embodiments. Similarly, a comparison of "less than" may be implemented as "less than or equal to" in various embodiments.

The above-described method may be performed while a vehicle is running. In other words, the method may be performed while the vehicle is traveling or in an ON state. The vehicle may be operating via power from the battery 24 and/or electric machine 22. Monitoring of the brake booster vacuum decay rate provides an accurate technique for leak detection. The method is not dependent on an initial brake booster vacuum pressure, but rather is based on a change in brake booster vacuum pressure. The method is also minimally dependent on start time and duration of the brake booster vacuum pressure test. The start time may be associated with when initial brake booster and brake line pressures are measured. Duration may be associated with the amount of time between the start time and when the last brake booster and brake line pressures are measured. At least for these reasons, the method may be performed to determine an accurate brake booster vacuum pressure decay rate and/or leak size while the vehicle is running. Also, since the above-described method may be performed when the vehicle is running and the engine is OFF, the method and associated test does not require that the control module 26 remain ON after key-off. The method and vacuum test may be performed repeatedly while the vehicle is running and thus does not need to be performed when the vehicle is OFF. This conserves battery power.

The above-described embodiments provide a brake booster system that is emission compliant and a brake booster leak detection system that is based directly on leak size. The start or initial brake booster vacuum has minimal to not impact on output of the leak detection system. An accurate decay rate and thus leaks of various sizes may be defected with a small amount of test time. The accurate detection aids in ensuring proper fuel economy.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, specification, and the following claims.

What is claimed is:

1. A control system for evaluating a brake booster system, comprising:
    an engine evaluation module that detects an engine off condition;
    a pressure evaluation module that, during the engine off condition, monitors hydraulic brake line pressure, detects a change in brake booster pressure, and determines a brake booster vacuum decay rate based on said change in brake booster pressure and a predetermined period; and
    a fault reporting module that detects a brake booster system fault based on said brake line pressure and said brake booster vacuum decay rate.

2. The system of claim 1 wherein the pressure evaluation module determines said change in brake booster pressure when the brake line pressure is less than a threshold.

3. The system of claim 1 wherein the fault reporting module detects said brake booster system fault when said brake booster vacuum decay rate exceeds a threshold.

4. The system of claim 1 wherein the fault reporting module generates a report status indicating a Test Pass when said brake booster vacuum decay rate is less than a predetermined threshold.

5. The system of claim 1 wherein:
    the fault reporting module applies a statistical filter to said brake booster vacuum decay rate and selectively detects the brake booster fault based on an output of said statistical filter; and
    said statistical filter is based on an exponentially weighted moving average.

6. The system of claim 1 wherein the engine evaluation module detects the engine off condition when an engine off parameter indicates an engine auto stop mode.

7. The system of claim 1 wherein said pressure evaluation module determines a change in brake line pressure, and
    wherein said pressure evaluation module determines said brake booster vacuum decay rate based on said change in brake line pressure.

8. The system of claim 7 wherein said pressure evaluation module determines said brake booster vacuum decay rate when said change in brake line pressure is less than a threshold.

9. The system of claim 1 wherein said pressure evaluation module determines an engine pressure, and
    wherein said pressure evaluation module determines said brake booster vacuum decay rate based on said engine pressure.

10. The system of claim 9 wherein said pressure evaluation module determines said engine pressure based on a manifold absolute pressure and a barometric pressure.

11. A method of monitoring a brake booster system for vacuum leaks, comprising:
    detecting an engine off condition;
    during the engine off condition, monitoring brake line pressure and determining a change in brake booster pressure;
    determining a brake booster vacuum decay rate based on said change in brake booster pressure and a predetermined period; and
    detecting a brake booster fault and generating a fault signal via a control module based on the brake line pressure and said brake booster vacuum decay rate.

12. The method of claim 11 wherein determining brake booster vacuum decay rate is performed when said brake line pressure is less than a threshold.

13. The method of claim 11 wherein said brake booster fault is detected when said brake booster vacuum decay rate exceeds a threshold.

14. The method of claim 11 further comprising generating a report status indicating a Test Fail when said brake booster vacuum decay rate exceeds a threshold.

15. The method of claim 11 further comprising generating a report status indicating a Test Pass when said brake booster vacuum decay rate is less than a threshold.

16. A hybrid vehicle that includes an engine, comprising:
   a brake booster vacuum system that is in fluid communication with a braking system, that is in vacuum pressure communication with an intake manifold of the engine, and that provides braking assistance to the braking system;
   a first pressure sensor that generates a brake line pressure signal based on a brake pressure of the braking system;
   a second pressure sensor that generates a brake booster pressure signal based on a brake booster pressure of the brake booster vacuum system; and
   a control module that detects a vacuum leak in the brake booster vacuum system based on the brake line pressure signal and a brake booster vacuum decay rate,
   wherein said control module determines said brake booster vacuum decay rate based on a change in said brake booster pressure signal and a predetermined period.

17. The hybrid vehicle of claim 16 wherein the control module detects said vacuum leak when the brake line pressure signal is less than a first threshold and the brake booster vacuum decay rate is greater than a second threshold.

18. The hybrid vehicle of claim 16 wherein the control module detects an engine off condition, and
   wherein the control module detects said vacuum leak during the engine off condition.

19. The vehicle of claim 16 wherein the control module applies a statistical filter to said brake booster vacuum decay rate, and
   wherein said control module detects said vacuum leak based on an output of said statistical filter.

20. The control system of claim 1, wherein:
   the pressure evaluation module monitors the hydraulic brake line pressure based on a brake line pressure signal received from a first pressure sensor; and
   the pressure evaluation module detects a change in brake booster pressure based on a brake booster pressure signal received from a second pressure sensor.

21. The method of claim 11, further comprising:
   indicating the brake booster fault via the control module; and
   at least one of illuminating an indicator lamp and generating an audio warning signal based on the fault signal.

* * * * *